(12) United States Patent
Sano

(10) Patent No.: US 8,684,428 B2
(45) Date of Patent: Apr. 1, 2014

(54) BUMPER RETAINER

(75) Inventor: Takahiro Sano, Toyohashi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 13/469,437

(22) Filed: May 11, 2012

(65) Prior Publication Data

US 2012/0292932 A1    Nov. 22, 2012

(30) Foreign Application Priority Data

May 18, 2011    (JP) .................................. 2011-111526

(51) Int. Cl.
*B60R 19/24*    (2006.01)
(52) U.S. Cl.
USPC .......................................... 293/155; 293/154
(58) Field of Classification Search
USPC ............................. 293/120–122, 154, 15, 155
See application file for complete search history.

(56) References Cited

U.S. PATENT DOCUMENTS

| 7,793,998 | B2 * | 9/2010 | Matsui et al. ................. 293/154 |
| 8,226,133 | B2 * | 7/2012 | Sano ............................. 293/155 |
| 2002/0117875 | A1 * | 8/2002 | Hoffner et al. ................ 296/194 |

FOREIGN PATENT DOCUMENTS

| JP | 5-89931 U | 12/1993 |
| JP | 2004114715 A | 4/2004 |
| JP | 2009083585 A * | 4/2009 |

* cited by examiner

*Primary Examiner* — Dennis H Pedder
*Assistant Examiner* — Beverly Becker
(74) *Attorney, Agent, or Firm* — Michael P. Leary

(57) ABSTRACT

When a retainer unit is fastened to a body, the rotation of a pin member around its longitudinal axis pushes out and widens the body mounting leg portion of the retainer unit, and the retainer unit is drawn into the body. As a result, the elastic flange of the leg is bent, the insertion hole in the body is sealed by the elastic flange of the leg, and infiltration of water from the outside is prevented. By drawing the retainer unit into the body, the pin member is also drawn into the body a slight distance (dimension α). As a result, the elastic flange of the pin member is bent, the pin insertion hole is sealed by the elastic flange of the pin member, and infiltration of water from the outside is prevented.

9 Claims, 5 Drawing Sheets

BUMPER RETAINER

CROSS-REFERENCE TO RELATED APPLICATIONS

This application claims priority from Japanese Patent Application No. 2011-111526 filed on May 18, 2011, the disclosure of which is incorporated herein by reference.

BACKGROUND OF THE INVENTION

The present invention relates to a bumper retainer for mounting a bumper cover on a vehicle body and, more specifically, to a bumper cover mounted so as to be properly accommodated at a predetermined position on the body.

In a bumper cover support structure for a vehicle in the prior art, the bumper cover is mounted on the body via a bumper cover support bracket or a bumper retainer. In a bumper cover support bracket, mounting holes are provided at a predetermined interval, and a grommet is integrally formed in each of these mounting holes. Mounting holes are provided at a predetermined interval in the bumper cover mounting portion of a body panel, the grommets formed in the bumper cover support bracket are inserted into these mounting holes, and secured by screws inserted into the mounting holes in the bumper cover support bracket. The bumper cover is mounted on the body when engagement holes in the bumper cover have engaged engagement hooks on the engagement plates of the bumper cover support bracket fixed to the body side (See Patent Document 1, Published Unexamined Japanese Patent Application No. 2004-114715).

A fastening clip of the prior art for fastening a plurality of fastened members has a cylindrical portion which is a round column with a long, round hole bored along the center line. This cylindrical portion has a diameter slightly smaller than the round fastening holes bored into the fastened members and is longer than the total thickness of the fastened members. A slit is formed in the cylindrical portion to expand the diameter on the leading edge. Also, a flange portion is formed at the base end of the cylindrical portion having a diameter greater than the fastening holes to complete the casing. An oval portion is formed in a shaft that can be inserted into a cylindrical portion. The external shape of this portion is nearly equal to an oval-shaped hole. A brim portion with a protruding knob is integrally formed with the base end of the shaft to complete an operating piece, and the shaft of the operating piece is rotatably inserted and fitted into the cylindrical portion of the housing so that the brim portion engages the flange portion (See Patent Document 2, Published Unexamined Japanese Utility Model Application No. 5-89931.

SUMMARY OF THE INVENTION

In the prior art technology, as mentioned in Patent Document 1, in order to mount a bumper cover on a body, a retainer has to be mounted on the body, and the bumper cover mounted on the retainer. In this way, the bumper cover is positioned and the body covered. (In other words, the bumper cover is accurately positioned and the external appearance of the body improved.) However, especially in the case of the rear bumper, holes are formed in the body and the bumper is mounted directly. As a result, sealing (waterproofing) is required. Usually, as mentioned in Patent Document 1, fasteners (screws) are fastened using a screwdriver. However, the bumper can also be fastened with tapping screws using an impact wrench. This generates axial force. Packing is set on the contact surface of the body to ensure a seal. Because a tool is required to mount the bumper on the retainer in Patent Document 1, the operational efficiency is lower.

The fastening clip described in Patent Document 2 enables two fastened members to be fastened without using a tool. However, it does not fasten a bumper retainer to a vehicle body. Because the fastening structure relies on a fastening clip structure in which an expandable cylindrical portion is expanded from the inside by a rotatable operating piece, the fastening strength is poor and waterproof performance is non-existent.

The object of the present invention is to solve this problem by providing a bumper retainer able to position a bumper cover and cover a panel and able to easily mount a bumper cover on the body without using a tool and without allowing water to infiltrate into the body.

In order to solve this problem, the present invention provides a bumper retainer for mounting a bumper cover on a vehicle body, wherein the bumper cover comprises a retainer unit for mounting the bumper cover so as to be properly accommodated at a predetermined position on the body, and a pin member for mounting the retainer unit on the body, wherein the retainer unit has a securing hook for securing the bumper cover, a vertical wall portion mounted on the body, a pin insertion hole provided in the vertical wall portion, and a body mounting leg portion provided on the body mounting side of the vertical wall portion so as to surround the pin insertion hole, wherein the pin member has a pin portion inserted into the pin insertion hole, a lever portion for rotating the pin portion around the longitudinal axis thereof between a first position and a second position, and a first flange portion extending outward radially from the longitudinal axis between the pin portion and the lever portion, wherein the pin portion is inserted into the pin insertion hole from the pin insertion side opposite the body mounting side at the first position, and the first flange portion makes contact with the pin insertion side wall surface of the vertical wall portion so the leading edge is surrounded by the pin insertion hole when the pin portion is inserted into the pin insertion hole, wherein the body mounting leg portion is inserted into a mounting hole in the body, and the pin portion is received inside, and wherein the pin portion is received inside at the first position without expanding the body mounting leg, and the body mounting leg portion is expanded at the second position, the leading edge being pushed outward from the mounting hole in the body and widened, thereby fastening the retainer unit in the body.

Preferably, in an aspect of the present invention, the retainer unit has a second flange portion extending outward radially from a leg mounting portion of a vertical wall portion provided with a body mounting leg portion, and the second flange unit comes into contact with a pin insertion side wall surface of the body so the leading edge is surrounded by the mounting hole in the body when the body mounting leg portion is inserted into the mounting hole in the body.

Preferably, in another aspect of the present invention, both the first flange portion of the pin member and the second flange portion of the retainer unit are flexible flanges, and the second flange portion bends towards the body and the first flange portion bends towards the vertical wall portion of the retainer unit when the body mounting leg portion expands and the retainer unit is drawn along with the pin member into the body.

Preferably, in yet another aspect of the present invention, the body mounting leg portion is a pair of opposing legs arranged so as to surround the inserted pin portion, the pin portion has a block-shaped portion for leg expansion, the block-shaped portion for leg expansion is able to rotate 90 degrees between a first position and a second position, and the width in the direction connecting the pair of legs in the block-shaped portion for leg expansion is shorter than the distance between the opposing legs at the first position, and greater than the distance between the opposing legs at the second position.

Preferably, in yet another aspect of the present invention, the pin portion also has a leading edge guide connected to the leading edge of the block-shaped portion for leg expansion, and a trunk portion connected to the trailing end of the block-shaped portion for leg expansion, the first flange portion and the lever portion are connected to the trunk portion, and the lever portion extends at a right angle relative to the longitudinal axis direction of the pin portion.

Preferably, in yet another aspect of the present invention, a body contact surface is provided in the leg mounting portion of the vertical wall portion of the retainer unit.

Preferably, in yet another aspect of the present invention, a reinforcing rib is provided on the pin insertion side of the vertical wall portion of the retainer unit for protecting the pin member, the reinforcing rib has a round shape large enough to accommodate the first flange portion, a cut away portion is provided in a portion of the round shape to ensure a range of movement for the lever portion, a lock-shaped portion is provided in a position near the leading edge of the lever portion, a pin retaining lock portion is provided in the cut away portion, and the lock-shaped portion and the pin retaining lock portion engage each other at the second position so as to lock the pin member in the retainer unit.

Preferably, in yet another aspect of the present invention, the leading edge of the lever portion protrudes from the retainer unit at either the first position or the second position, causing the protruding leading edge to become visible.

Preferably, in yet another aspect of the present invention, the pair of opposing legs are a pair of legs opposing each other vertically in the vertical direction, the lever portion extends vertically at the first position in the direction connecting the pair of legs, the block-shaped portion for leg expansion has a shape in which the width in the horizontal direction is greater than the width in the vertical direction at the first position, the leading edge guide has a width in the horizontal direction which becomes narrower towards the leading edge at the first position, the connection between the block-shaped portion for leg expansion and the leading edge guide forms a neck-shaped portion at the first position having a width in the vertical direction smaller than the width of the leading edge guide in the vertical direction.

By rotating the pin member without using a tool, the body mounting leg portion of the present invention expands and the leading edge is pushed out from the mounting hole in the body and expanded, thereby fastening the retainer unit to the body. As a result, the bumper retainer can be easily mounted on the body, and the operational effectiveness of the mounting operation for the bumper cover is improved.

In the present invention, when the bumper retainer is fastened to the body, two elastic flanges, one on the retainer unit and the other on the pin member, are bent towards the body and the retainer unit, respectively. As a result, infiltration of water into the body from the mounting hole in the body and the pin insertion hole in the retainer unit can be prevented.

In the present invention, the leading edge of the lever portion of the pin member protrudes from the retainer unit at either the first position or the second position, and the protruding leading edge becomes visible. As a result, the operator can easily determine whether or not the fastening operation has been completed based on whether the leading edge of the lever portion is accommodated inside the retainer unit or protrudes from the retainer unit.

In the present invention, a contact surface is provided in the retainer unit. As a result, deformation of the retainer unit by gravity or external stress can be suppressed after the bumper cover has been mounted. It also prevents the transmission of stress to the elastic flanges, and maintains waterproof performance.

PREFERRED EMBODIMENT OF THE INVENTION

Figure 1:
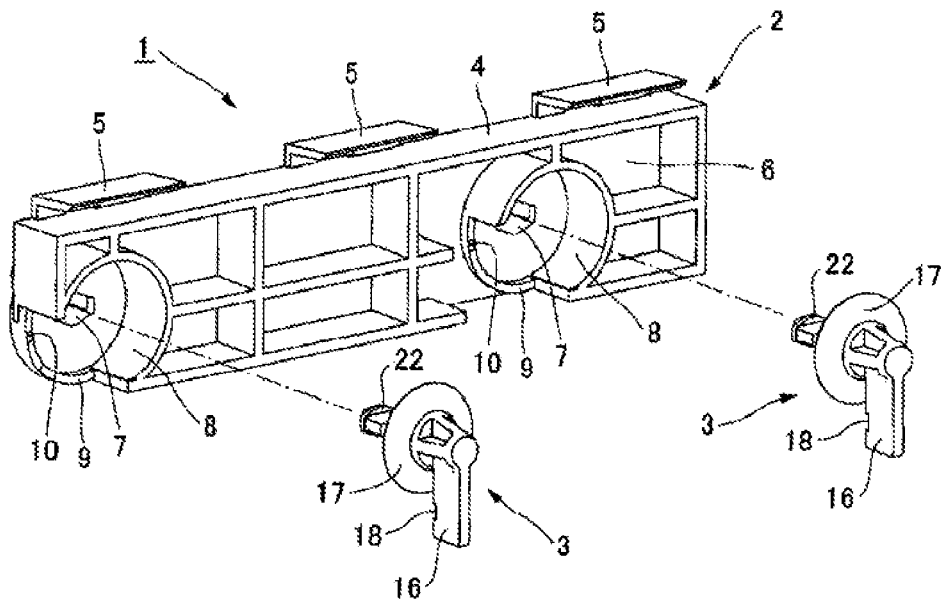
FIG. 1 is a perspective view from the pin insertion side of the retainer unit and the pin members before assembly of the bumper retainer in one embodiment of the present invention.

The following is an explanation of the bumper retainer in an embodiment of the present invention with reference to the drawings. First, the structure of the bumper retainer 1 will be explained with reference to FIG. 1 through FIG. 4.

As shown in FIG. 1 through FIG. 4, the bumper retainer 1 includes a retainer unit 2 and a pin member 3. In a typical bumper retainer 1, the pin member 3 is inserted into the retainer unit 2 (see FIG. 3 and FIG. 4). In the embodiment shown in the drawings, two pin members 3 are inserted into the retainer unit 2. However, the number of pin members 3 changes depending on the number of fastening locations in the body 30 for the bumper retainer 1 (see FIG. 5 through FIG. 8), that is, the number of mounting holes in the body 30.

As shown in FIG. 1, the retainer unit 2 has a C-shaped cross-sectional structure in which a recess is formed at the back on the body side facing outward from the vehicle. Securing hooks 5 are provided in the upper wall portion 4 for securing the bumper cover 40 (see FIG. 7), and pin insertion holes 7 are provided in the vertical wall portion 6 for inserting a portion of the pin member 3. The number of pin insertion holes 7 is equal to the number of pin members 3. As in the case of the number of pin members 3, the number changes depending on the number of fastening locations in the body 30 for the bumper retainer 1, that is, the number of mounting holes in the body 30.

Figure 3:
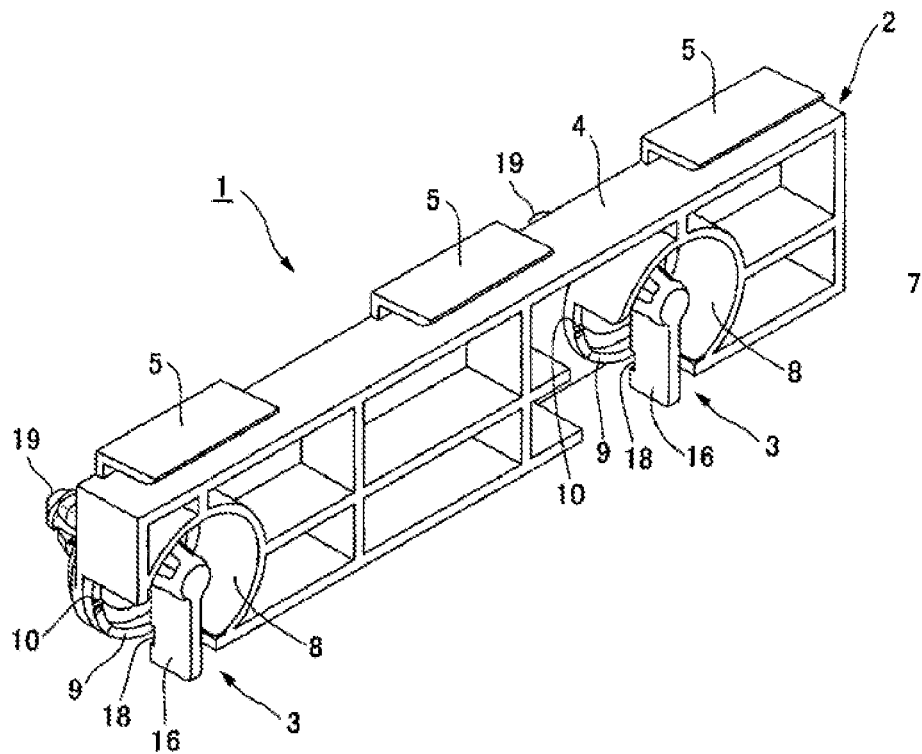
FIG. 3 is a perspective view from the pin insertion side of the retainer unit and the pin member after assembly of the bumper retainer in one embodiment of the present invention.

As shown in FIG. 1 and FIG. 3, a reinforcing rib 8 is provided to surround each pin insertion hole 7, and the reinforcing ribs 8 form a round recess. A portion of the reinforcing rib 8 is cut away along a 90-degree arc to form a cut away portion 9. A pin retaining lock portion 10 is provided in the cut away portion 9 to lock the pin member 3.

Figure 2:
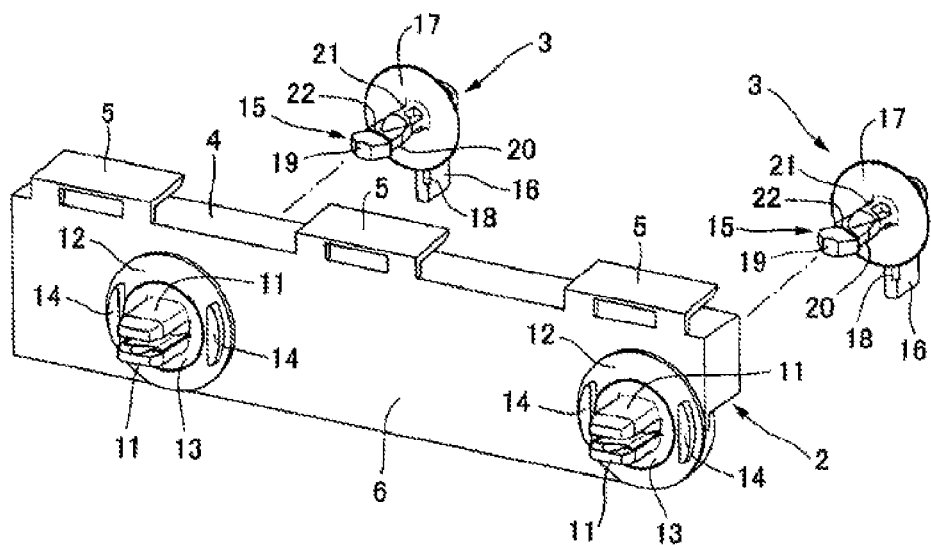
FIG. 2 is a perspective view from the body side of the retainer unit and the pin member before assembly of the bumper retainer in one embodiment of the present invention.
Figure 4:
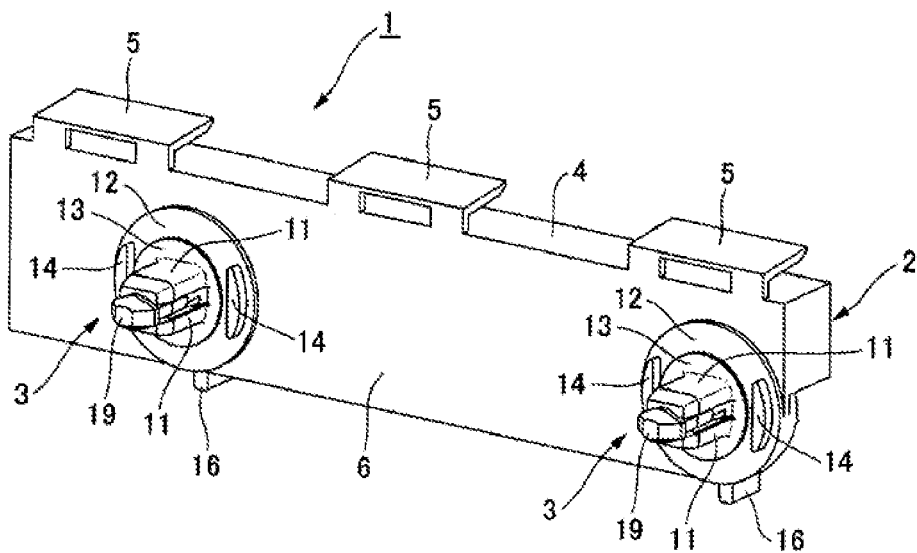
FIG. 4 is a perspective view from the body side of the retainer unit and the pin member after assembly of the bumper retainer in one embodiment of the present invention.

As shown in FIG. 2 and FIG. 4, a body mounting leg portion 11 to be inserted into a mounting hole in the body 30 (see FIG. 5 through FIG. 8) is provided in the body side wall surface of the vertical wall portion 6 of the retainer unit 2. As in the case of the number of pin insertion holes 7 and pin members 3, the number of body mounting leg portions 11 changes depending on the number of fastening locations in the body 30 for the bumper retainer 1, that is, the number of mounting holes in the body 30. Each body mounting leg portion 11 is provided so as to surround the pin insertion hole 7, and has a pair of legs facing each other in the vertical direction. A portion of the pin member 3 is accommodated inside (see FIG. 3 and FIG. 4).

Each body mounting leg portion 11 is provided in a round leg mounting portion 12 bulging slightly from the body side wall surface of the vertical wall unit 6 (see FIG. 4). A flexible flange 13 of the leg portion 11 is provided in the leg mounting portion 12 extending outward radially from the base portion of the body mounting leg portion 11 towards the body side (see FIG. 5 through FIG. 8). The flexible flange 13 of the leg portion 11 comes into contact with the pin insertion side wall surface of the body 30 so that the leading edge surrounds the insertion hole in the body 30 when the body mounting leg portion 11 is inserted into a mounting hole in the body 30.

Also, a body contact surface 14 is provided in the leg mounting portion 12. The body contact surface 14 is provided on both sides of the flexible flange 13 of the leg portion 11. When the leading edge of the flexible flange 13 of the leg portion 11 comes into contact with the body 30, the leading edge protrudes from the leg mounting portion 12 towards the body 30 so as to come into contact with the body 30. By managing the body contact surface 14, deformation of the bumper retainer 1 by stress can be suppressed after the bumper cover 40 has been mounted, the application of stress to the flexible flange 13 of the leg unit 11 can be prevented, and waterproof performance can be maintained.

Each pin member 3 has a pin portion 15 inserted into the pin insertion hole 7 in the retainer unit 2, a lever portion 16 joined at a right angle to the longitudinal axis of the pin portion 15, and a flexible flange of the pin member 17 extending outward radially from the longitudinal axis of the pin portion 15 between the pin portion 15 and the lever portion 16. The lever portion 16 can rotate 90 degrees between a vertical position extending downward vertically relative to the longitudinal axis of the pin unit 15 (see FIG. 1 through FIG. 5) and a horizontal position extending parallel to the longitudinal axis in the horizontal direction (see FIG. 6). By rotating the lever portion 16, the pin portion 15 is rotated 90 degrees around its longitudinal axis. In the pin member 3, the pin portion 15 is inserted in a pin insertion hole 7 in the retainer unit 2 at the vertical position (see FIG. 3 through FIG. 5), and the retainer unit 2 is mounted to the body 30 and fastened in the horizontal position (see FIG. 6).

Figure 6:
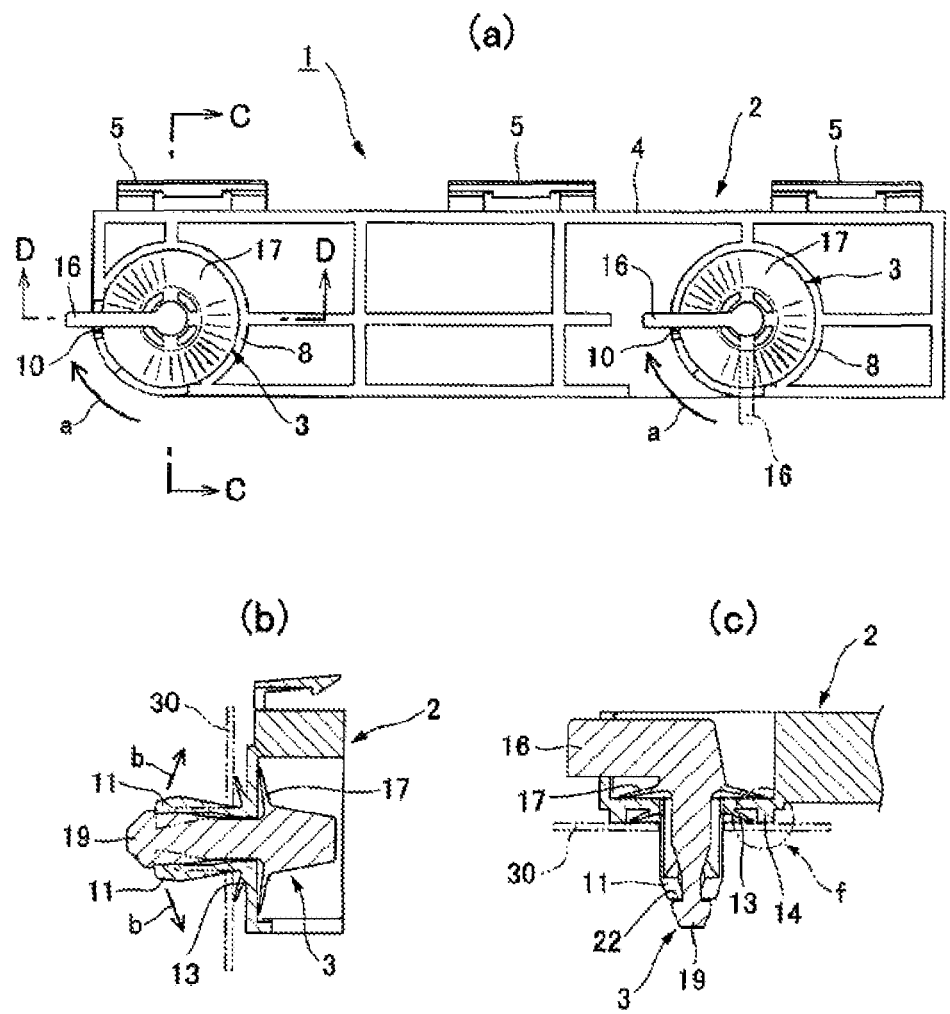
FIG. 6 is a diagram showing the bumper retainer in one embodiment of the present invention after being fastened to a body in which (a) is a front view from the pin member insertion side, (b) is a cross-sectional view from line C-C in (a), and (c) is a cross-sectional view from line D-D in (a).

A cut away portion 9 is provided in the reinforcing rib 8 as mentioned above in order to ensure a range of movement for the lever portion 16. A cut away portion is also provided in the lower wall portion of the retainer unit 2 for the same reason (see FIG. 1 and FIG. 3). A lock-shaped portion 18 is provided at a position near the leading edge of the lever portion 16. When the lever portion 16 is in the horizontal position as shown in FIG. 6, the lock-shaped portion 18 engages the pin retaining lock portion 10 in the cut away portion 9, and the pin member 3 is locked in the retainer unit 2.

The pin portion 15 has a leading edge guide 19 forming a leading edge portion, a block-shaped portion for leg expansion 20 joined to the leading edge guide 19, and a trunk portion 21 joined to a trailing end of the block-shaped portion for leg expansion 20. When the bumper retainer 1 is assembled, the leading edge guide 19 protrudes forward from the body mounting leg portion 11, and the block-shaped portion for leg expansion 20 is accommodated inside the body mounting leg portion 11. The trunk portion 21 is accommodated inside the opening in the pin insertion hole 7 (see FIG. 3 through FIG. 5). The flexible flange of the pin member 17 and the lever portion 16 are joined to the trunk portion 21. When the pin portion 15 is inserted into the pin insertion hole 7, the leading edge of the flexible flange of the pin member 17 comes into contact with the pin insertion side wall surface of the vertical wall portion 6 so as to surround the pin insertion hole 7 (see FIG. 5).

Figure 5:
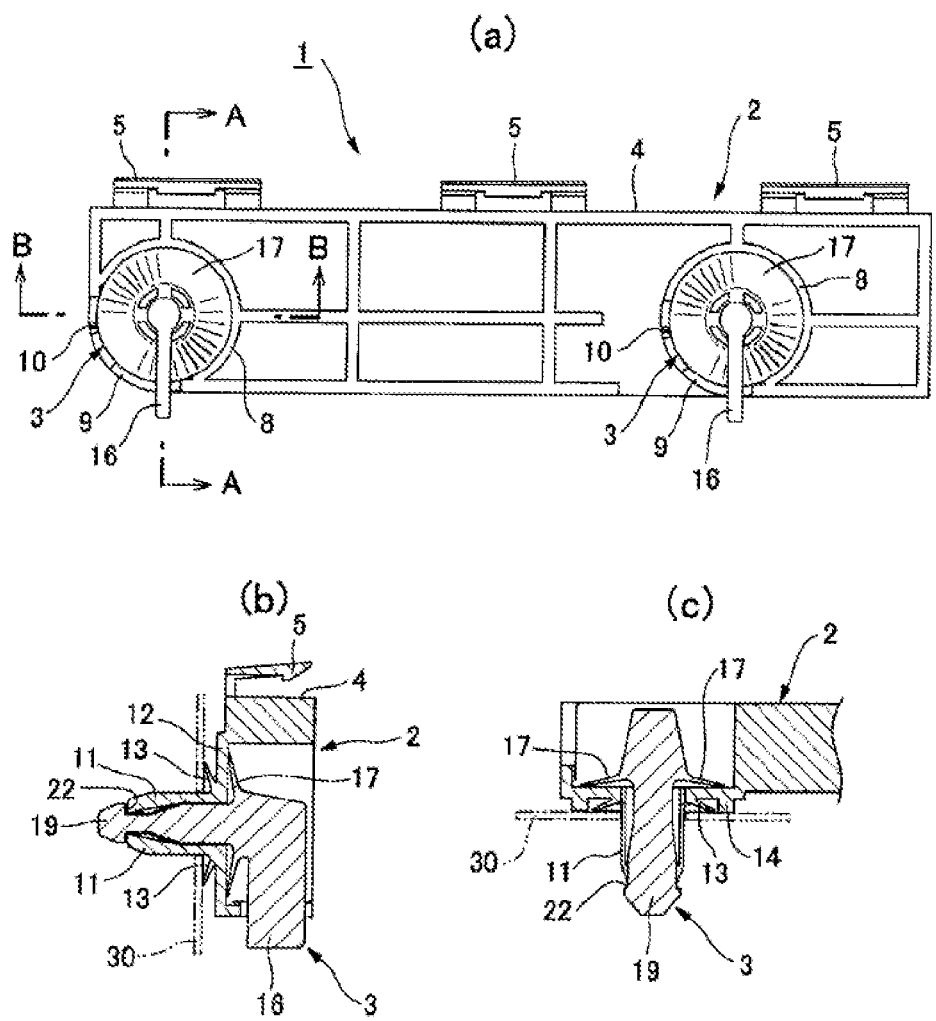
FIG. 5 is a diagram showing the bumper retainer in one embodiment of the present invention before being fastened to a body in which (a) is a front view from the pin member insertion side, (b) is a cross-sectional view from line A-A in (a), and (c) is a cross-sectional view from line B-B in (a).

When the pin portion 15 is inserted into the pin insertion hole 7 at the vertical position, the leading edge of the lever portion 16 extending downward vertically protrudes from the bottom end of the vertical wall portion 6 and the protruding leading edge becomes visible to the operator (see FIG. 5). This causes the lever portion 16 to protrude from the retainer unit 2 (see FIG. 5). However, when the lever portion 16 is rotated to complete the fastening of the bumper retainer 1 to the body 30, the lever portion 16 is accommodated inside the retainer unit 2 (see FIG. 6). Therefore, when the fastening operation has been completed, the fact that the lever portion 16 is not protruding from the retainer unit 2 can be visually confirmed. As a result, traceability can be ensured. In other words, when the lever portion 16 is protruding from the bottom end of the retainer unit 2 during the fastening operation, the operator can visually confirm that the fastening operation has not been completed. The completion of the fastening operation can be visually confirmed when the lever portion is accommodated inside the retainer unit 2.

As shown in FIG. 1 and FIG. 2, the horizontal width of the block-shaped portion for leg expansion 20 in the pin portion 15 is greater than the vertical width at the vertical position. Also, the vertical width is smaller than the distance between the pair of legs in the body mounting leg portion 11, and the horizontal width is larger than this distance (see FIG. 5 and FIG. 6). Because of this shape, the block-shaped portion for leg expansion 20 receives the non-expanded legs of the body mounting leg portion 11 at the vertical position, but expands the legs in the body mounting leg portion 11 at the horizontal position, pushing out and expanding the leading edge of the legs of the body mounting leg portion 11 from the mounting hole in the body 30. This fastens the retainer unit 2 to the body 30.

As shown in FIG. 1 and FIG. 2, the leading edge guide 19 in the pin portion 15 has a trapezoidal shape in the vertical position in which the width in the horizontal direction narrows towards the leading edge as viewed from above. This makes it easy to insert the leading edge of the pin portion 15 into the pin insertion hole 7. The connection between the block-shaped portion for leg expansion 20 and the leading edge guide 19 forms a neck-shaped portion 22 at the vertical position in which the vertical width is smaller than the vertical width of the leading edge guide 19. Thus, when the pin portion 15 is inserted at the vertical position, the legs of the body mounting leg portion 11 join the neck-shaped portion 22. The trunk portion 21 has a cylindrical shape so that it can rotate inside the opening in the pin insertion hole 7. The pin insertion hole 7 matches the shape of the block-shaped portion for leg expansion 20 when the pin portion 15 has been inserted. It also has a shape in which the horizontal width is somewhat larger than the vertical width.

The following is an explanation of the operation of the bumper retainer 1 with reference to FIG. 5 through FIG. 8. First, the assembly of the bumper retainer 1 will be explained. As mentioned above, in a typical bumper retainer 1, the pin member 3 is inserted into the retainer unit 2 (see FIG. 3 and FIG. 4). In other words, the pin portion 15 of the pin member 3 at the vertical position shown in FIG. 1 and FIG. 2 is inserted into the pin insertion hole 7 in the round recess surrounded by the reinforcing rib 8 of the retainer unit 2.

The leading edge guide 19 on the inserted pin portion 15 extends beyond the leading edge of the body mounting leg portion 11 and protrudes in the forward direction. Because the vertical width of the block-shaped portion for leg expansion 20 is smaller than the distance between the legs of the body mounting leg portion 11 at the vertical position, the legs do not expand and the leading edges of the legs engage the neck-shaped portion 22. This keeps the pin member 3 from coming out of the retainer unit 2 after assembly. At this time, the block-shaped portion for leg expansion 20 in the pin portion 15 is accommodated inside the body mounting leg portion 11 so that it is interposed horizontally between the legs. The round flexible flange of the pin member 17 is accommodated inside the round recess surrounded by the reinforcing rib 8, and the leading edge comes into contact with the pin insertion side wall surface of the vertical wall portion 6 so as to surround the pin insertion hole 7 (see FIG. 5).

The following is an explanation of the mounting and fastening of the bumper retainer 1 in the body 30. FIG. 5 shows the body mounting leg portion 11 of the bumper retainer 1 shown in FIG. 3 and FIG. 4 after it has been inserted into a mounting hole in the body 30 but before it has been fastened. At this time, the leading edge of the lever portion 16 of the pin member 3 protrudes from the bottom end of the retainer unit 2 at the vertical position, and the protrusion is visible to the operator as mentioned above. Also, the leading edge guide 19 of the member portion 15 extends beyond the leading edge of the body mounting leg portion 11 and protrudes in the forward direction. The leading edge of the legs engage the neck-shaped portion 22 of the block-shaped portion for leg expansion 20, and the leading edge of the round flexible flange of the pin member 17 on the pin member 3 makes contact with the pin insertion side wall surface of the vertical wall portion 6 so as to surround the pin insertion hole 7. Also, the leading edge of the flexible flange of the leg portion 13 makes contact with the pin insertion side wall surface of the body 30 so as to surround the mounting hole in the body 30. The leading edge of the body contact surface 14 also makes contact with body 30 on both sides of the flexible flange of the leg portion 13.

After a body mounting leg portion 11 of the retainer unit 2 has been inserted into all of the mounting holes in the body 30, the operator rotates the lever portion 16 in the direction of arrow (a) as shown in FIG. 6. When the lever portion 16 has been rotated to the horizontal position, the lock-shaped portion 18 of the lever portion 16 engages the pin retaining lock portion 10 of the retainer unit 2, and this locks the pin member 3 in the retainer unit 2.

When the lever portion 16 has been rotated from the vertical position to the horizontal position, the rotation is transmitted to the block-shaped portion for leg expansion 20 via the trunk portion 21 of the pin member 3, and the block-shaped portion for leg expansion 20 is rotated 90 degrees. The block-shaped portion for leg expansion 20 accommodated inside the body mounting leg portion 11 of the retainer unit 2, as indicated by arrow (b), pushes the legs of the body mounting leg portion 11 from the inside to the outside and widens them. This extends the body mounting leg portion 11. The extension of the legs makes the vertical width of the body mounting leg portion 11 greater than the mounting hole in the body 30. The extended body mounting leg portion 11 and the flexible flange of the pin member 17 in contact with the retainer unit 2 fastens the body 30 and the retainer unit 2.

Figure 8:
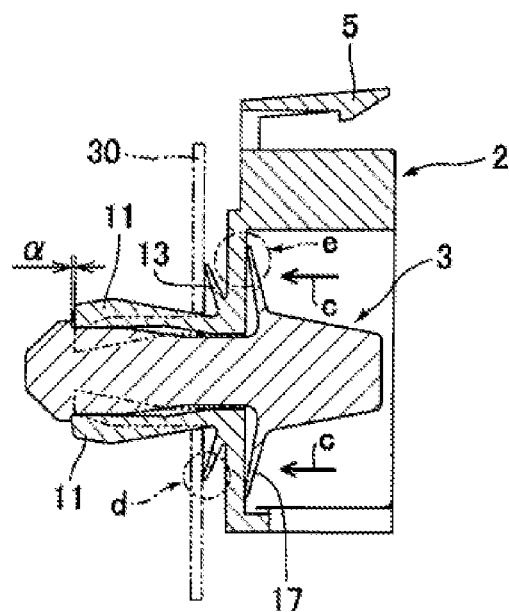
FIG. 8 is a cross-sectional view similar to (b) in FIG. 6 showing the seal structure of the bumper retainer in one embodiment of the present invention after the bumper retainer has been fastened to the body.

When the legs of the body mounting leg portion 11 are pushed out and widened, the retainer unit 2 is drawn into the body 30 as indicated by arrow (c) in FIG. 8. This bends the flexible flange of the leg portion 13, and the contact surface area of the leading edge and the outer wall surface of the body 30 increases (see round portion (d)). As a result, the mounting hole in the body 30 is sealed by the flexible flange of the leg portion 13, and infiltration of water from the outside is prevented. Also, when the retainer unit 2 is drawn into the body 30, the pin member 3 is drawn into the body 30 a slight distance (dimension α). This bends the flexible flange of the pin member 17, and the contact surface area of the leading edge and the pin insertion side wall surface of the retainer wall 2 increases (see round portion (e)). As a result, the pin insertion hole 7 is sealed by the flexible flange of the pin member 17, and infiltration of water from the outside is prevented.

In the structure described above, two (waterproof) seals are generated at a single fastening location (between the retainer unit 2 and the body 30, and between the retainer unit 2 and the pin member 3), and flexible flanges (a flexible flange of the leg portion 13 and a flexible flange of the pin member 17, respectively) are provided to ensure sufficient sealing properties (waterproofing properties).

Also, a retainer contact surface 14 is provided in the retainer unit 2. By managing the contact between the body contact surface 14 and the body 30 (see circular portion (f) in FIG. 6(c)), deformation of the retainer unit 1 by stress can be suppressed after the bumper cover has been mounted, the application of stress to the flexible flange of the leg unit 13 can be prevented, and waterproof performance can be maintained.

Figure 7:
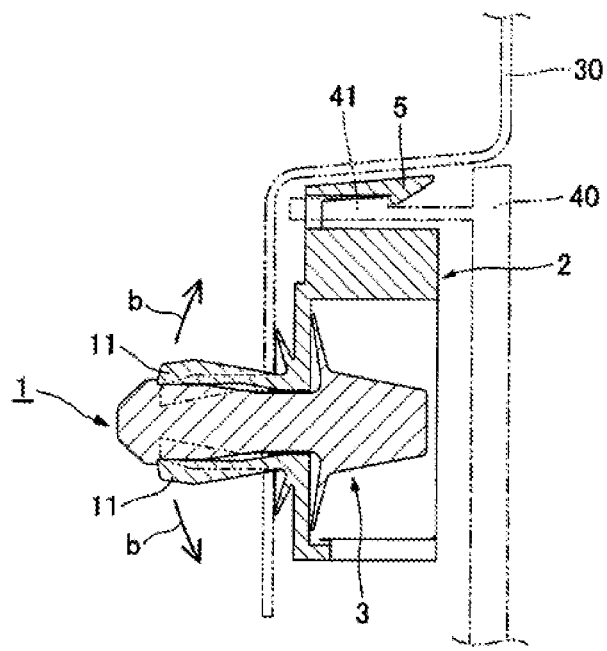
FIG. 7 is a cross-sectional view similar to (b) in FIG. 6 showing the bumper cover attached to the bumper retainer in one embodiment of the present invention after the bumper retainer has been fastened to the body.

After fastening the bumper retainer 1 to the body 30, as shown in FIG. 7, the bumper cover 40 is mounted on the bumper retainer 1. The bumper retainer 1 is mounted by engaging the engaging portion 41 of the bumper cover 40 with the securing hooks 5 of the bumper retainer 1.

The bumper retainer 1 in an embodiment of the present invention was explained above. However, other variations are possible. In the embodiment shown in the drawings, the lever portion 16 protrudes from the bottom end of the retainer unit 2 at the vertical position before fastening (see FIG. 5), and is accommodated inside the retainer unit 2 at the horizontal position after fastening (see FIG. 6). However, a configuration is possible in which the lever portion is accommodated inside the retainer unit 2 before fastening, and protrudes from the bottom end after fastening. In contrast to the structure of the embodiment shown in the drawing, this is achieved either by having the structure of the body mounting leg portion 11 or the structure of the block-shaped portion for leg expansion 20 rotate 90 degrees in the axial direction.

In this variation, the operator can visually determine that the fastening operation has not been completed when the lever portion 16 is accommodated inside the retainer unit 2, and can determine that the fastening operation has been completed when the lever portion is protruding from the bottom end of the retainer unit 2.

Also, in the embodiment shown in the drawings, the body mounting leg portion 11 has a pair of legs. However, it can have a plurality of legs. Also, the angle of the lever portion 16 before fastening and after fastening is set at 90 degrees. However, the number and installation angle of the legs in the body mounting leg portion 11 can be set as desired, and the structure of the block-shaped portion for leg expansion 20 can be set accordingly to rotate in the axial direction at the desired angle.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A bumper retainer for mounting a bumper cover on a vehicle body, comprising:
    a retainer unit for mounting the bumper cover so as to be properly accommodated at a predetermined position on the body, and a pin member for mounting the retainer unit on the body,
    wherein the retainer unit has a securing hook for securing the bumper cover, a vertical wall portion adapted to be mounted on the body, a pin insertion hole provided in the vertical wall portion, and a body mounting leg portion defining a body mounting leg portion leading edge and being provided on a body mounting side of the vertical wall portion so as to surround the pin insertion hole, the body mounting leg portion being integral with the retainer unit,
    wherein the pin member has a pin portion defining a pin portion leading edge and being inserted into the pin insertion hole, a lever portion for rotating the pin portion around the longitudinal axis thereof between a first position and a second position, and a first flange portion extending outward radially from the longitudinal axis between the pin portion and the lever portion,
    wherein the pin portion is inserted into the pin insertion hole from a pin insertion side opposite the body mounting side at the first position, and the first flange portion makes contact with the pin insertion side wall surface of the vertical wall portion so the pin portion leading edge is surrounded by the pin insertion hole when the pin portion is inserted into the pin insertion hole,
    wherein the body mounting leg portion is adapted to be inserted into a mounting hole in the body, and the pin portion is received inside, and
    wherein the pin portion is received inside at the first position without expanding the body mounting leg, and the body mounting leg portion is expanded at the second position, the body mounting leg portion leading edge being pushed outward from the mounting hole in the body and widened, thereby fastening the retainer unit in the body.

2. A bumper retainer for mounting a bumper cover on a vehicle body, comprising:
    a retainer unit for mounting the bumper cover so as to be properly accommodated at a predetermined position on the body, and a pin member for mounting the retainer unit on the body,
    wherein the retainer unit has a securing hook for securing the bumper cover, a vertical wall portion adapted to be mounted on the body, a pin insertion hole provided in the vertical wall portion, and a body mounting leg portion defining a body mounting leg portion leading edge and being provided on a body mounting side of the vertical wall portion so as to surround the pin insertion hole,
    wherein the pin member has a pin portion defining a pin portion leading edge and being inserted into the in insertion hole, a lever portion for rotating the in portion around the longitudinal axis thereof between a first position and a second position, and a first flange portion extending outward radially from the longitudinal axis between the pin portion and the lever portion,
    wherein the in portion is inserted into the in insertion hole from a in insertion side opposite the body mounting side at the first position, and the first flange portion makes contact with the in insertion side wall surface of the vertical wall portion so the pin portion leading edge is surrounded by the in insertion hole when the in portion is inserted into the in insertion hole,
    wherein the body mounting leg portion is adapted to be inserted into a mounting hole in the body, and the pin portion is received inside,
    wherein the retainer unit has a second flange portion extending outward radially from a leg mounting portion of a vertical wall portion adjacent the body mounting leg portion, and wherein the second flange portion comes into contact with a pin insertion side wall surface of the body so the pin portion leading edge is surrounded by the mounting hole in the body when the body mounting leg portion is inserted into the mounting hole in the body, and
    wherein the in portion is received inside at the first position without expanding the body mounting leg, and the body mounting leg portion is expanded at the second position, the body mounting leg portion leading edge being pushed outward from the mounting hole in the body and widened, thereby fastening the retainer unit in the body.

3. The bumper retainer as claimed in claim 2, wherein both the first flange portion of the pin member and the second flange portion of the retainer unit are flexible flanges, and wherein the second flange portion bends towards the body and the first flange portion bends towards the vertical wall portion of the retainer unit when the body mounting leg portion expands and the retainer unit is drawn along with the pin member into the body.

4. The bumper retainer as claimed in claim 1, wherein the body mounting leg portion includes a pair of opposing legs arranged so as to surround the inserted pin portion, wherein the pin portion has a block-shaped portion for leg expansion, wherein the block-shaped portion for leg expansion is able to rotate 90 degrees between a first position and a second position, and wherein the width in the direction connecting the pair of legs in the block-shaped portion for leg expansion is shorter than the distance between the opposing legs at the first position, and greater than the distance between the opposing legs at the second position.

5. The bumper retainer as claimed in claim 4, wherein the block-shaped portion defines a leading edge and a trailing end, and wherein the pin portion includes a leading edge guide connected to the block-shaped portion leading edge for leg expansion, and a trunk portion connected to the block-shaped portion trailing end for leg expansion, wherein the first flange portion and the lever portion are connected to the trunk portion, and wherein the lever portion extends at a right angle relative to the longitudinal axis direction of the pin portion.

6. The bumper retainer as claimed in claim 2, wherein a body contact surface is disposed on the leg mounting portion of the vertical wall portion of the retainer unit.

7. The bumper retainer as claimed in claim 6, wherein a reinforcing rib is provided on the pin insertion side of the vertical wall portion of the retainer unit for protecting the pin member, wherein the reinforcing rib has a round shape large enough to accommodate the first flange portion, wherein a cut away portion is provided in a portion of the round shape to ensure a range of movement for the lever portion, a lock-shaped portion is provided in a position near the leading edge of the lever portion, a pin retaining lock portion is provided in the cut away portion, and wherein the lock-shaped portion and the pin retaining lock portion engage each other at the second position so as to lock the pin member in the retainer unit.

8. The bumper retainer as claimed in claim 1, wherein the lever portion defines a leading edge which protrudes from the retainer unit at either the first position or the second position, causing the protruding leading edge to become visible.

9. The bumper retainer as claimed in claim 5, wherein the pair of opposing legs oppose each other vertically in the vertical direction, wherein the lever portion extends vertically at the first position in the direction connecting the pair of legs, wherein the block-shaped portion for leg expansion has a shape in which the width in the horizontal direction is greater than the width in the vertical direction at the first position, wherein the leading edge guide has a width in the horizontal direction which becomes narrower towards the leading edge at the first position, and wherein the connection between the block-shaped portion for leg expansion and the leading edge guide forms a neck-shaped portion at the first position having a width in the vertical direction smaller than the width of the leading edge guide in the vertical direction.

* * * * *